United States Patent
Richardson

(10) Patent No.: US 6,317,788 B1
(45) Date of Patent: Nov. 13, 2001

(54) ROBOT POLICIES FOR MONITORING AVAILABILITY AND RESPONSE OF NETWORK PERFORMANCE AS SEEN FROM USER PERSPECTIVE

(75) Inventor: David Eugene Richardson, Ft. Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/183,420

(22) Filed: Oct. 30, 1998

(51) Int. Cl.[7] .................................................. G06F 13/00
(52) U.S. Cl. .............................................. 709/224; 714/57
(58) Field of Search ..................................... 709/202–203, 709/223–224; 714/4, 47, 57; 345/356; 713/1; 395/704

(56) References Cited

U.S. PATENT DOCUMENTS

| | | | |
|---|---|---|---|
| 5,819,033 | * 10/1998 | Caccavale | 709/224 |
| 5,872,976 | * 2/1999 | Yee et al. | 395/704 |
| 5,930,476 | * 7/1999 | Yamunachari et al. | 709/224 |
| 5,937,165 | * 8/1999 | Schwaller et al. | 709/224 |
| 5,941,954 | * 8/1999 | Kalajan | 709/239 |
| 5,961,594 | * 10/1999 | Bouvier et al. | 709/223 |
| 5,978,911 | * 11/1999 | Knox et al. | 713/1 |
| 6,006,269 | * 12/1999 | Phaal | 709/227 |
| 6,040,834 | * 3/2000 | Jain et al. | 345/356 |
| 6,061,725 | * 5/2000 | Schwaller et al. | 709/224 |
| 6,070,190 | * 5/2000 | Reps et al. | 709/224 |

\* cited by examiner

Primary Examiner—David Wiley

(57) ABSTRACT

A method for monitoring performance data illustrative of the performance seen by a user is presented. A "robot" policy which executes a user action emulation utility is deployed to a network node in a computer network, where it is installed and periodically executed to obtain performance data pertaining to the user action. Monitored performance data is compared to matched conditions defined within the robot policy such that, when matched, a set of automated actions are triggered.

13 Claims, 5 Drawing Sheets

ROBOT POLICIES FOR MONITORING AVAILABILITY AND RESPONSE OF NETWORK PERFORMANCE AS SEEN FROM USER PERSPECTIVE

FIELD OF THE INVENTION

The present invention pertains generally to network systems and, more particularly, to a method and system for using robot policies that emulate user actions to detect and correct network problems as seen from the user's standpoint.

BACKGROUND OF THE INVENTION

As computer networks have become more prevalent in corporate environments, network management software, which has the ability to solve a number of network problems automatically and remotely, has become crucial. One of the major goals of any efficient network administration setup is the specification and measurement of acceptable performance thresholds for each machine in the network without creating additional network traffic.

Network management software typically manages and automates administrative tasks across multiple machines in a network. Typical network management software allows administrators to run realtime diagnostics, provides realtime measurements, creates reports, logs events, filters events and generates alerts when performance criteria match prespecified conditions, installs applications and remotely configures multiple managed nodes.

One method of detecting problems is via a "policy". A policy is a set of specifications that define thresholds and conditions which trigger automated network administration actions. Policies have been developed which monitor system performance parameters such as percent disk utilization, percent memory I/O activity, network traffic, etc. For example, Hewlett Packard's ManageX includes a set of Intelligence Policies (IPs), comprising scripts containing sets of rules and actions (known as alerts) which take action according to defined thresholds on system counters (including such items as percent free disk space, processor queue lengths, and page faults per second). These Intelligence Policies function as network watchdogs for the systems administrator, constantly measuring the actual performance of each machine on the network against these thresholds.

Performance data obtained from network system software is useful in monitoring parameters of the network system as a whole, and for generating reports. Performance data assists the administrator in pinpointing system problems such as full disks, faulty network cards, etc. However, the type of performance data obtained via network management software in the past has not included a crucial aspect of system performance—namely, performance data illustrative of the performance seen by a user as triggered by a user action. For example, performance data illustrative of the performance seen by a user when attempting to access a server's website may include the length of time it takes for the page to load into the user's browser. As another example, the user may receive a "404 Not Found" error that the website administrator may be unaware of. With the prior art, policies could be set up to monitor the number of "404" errors, but this information did not assist the administrator in determining which web site generates this error.

Accordingly, a need exists for a method for deploying policies that provide useful performance data pertaining to user actions as seen by a user.

SUMMARY OF THE INVENTION

A novel method for ascertaining performance data of a network or network component as seen by the user presented herein. A network management system deploys a "robot" policy (i.e., a policy that emulates a user action) to a computer in an enterprise network, where it is installed and periodically executed to obtain performance data pertaining to the user action. A matched condition is defined that, when matched, triggers a set of actions to be performed.

In an illustrative example, a robot policy that tests the availability of a web page on a web server from a managed node attempts to load a web page. The robot policy triggers an alert message to the managing console if the page is unavailable, has been moved, or any other error occurs. In this case, the predefined error messages received from the utility are the matched condition and the dispatch of the alert message to the managing console is the trigger.

In another illustrative example, a robot policy tests the response time as seen by the user to load a web page from a managed node. An alert message is sent to the managing console if the length of time exceeds a predefined threshold length of time. In this case, the predefined threshold length of time is the matched condition and the dispatch of a message to the managing console is the trigger.

Similar robot policies that execute other types of user action emulation utilities, such as testing the availability of an email address or amount of time it takes for an email message to arrive at its target destination, may be set up in accordance with the invention. Unlike prior art network management systems in which performance data in the form of CPU utilization, memory utilization, storage capacity statistics, and network card statistics, among other performance data, the present invention allows the automatic event notification and performance data of aspects of the network caused by user actions as seen from the perspective of the users themselves. This allows network administrators to be notified of precise user interface problems before they may actually be discovered by real users. In addition, the invention tells the network administrator exactly what the symptom of the problem is, and where it occurs, which assists the administrator in knowing where to look in determining the actual source of the problem. Accordingly, the invention provides an additional informational tool for efficiently pinpointing and correcting sources of network problems.

BRIEF DESCRIPTION OF THE DRAWING

The invention will be better understood from a reading of the following detailed description taken in conjunction with the drawing in which like reference designators are used to designate like elements, and in which.

DETAILED DESCRIPTION

A novel method for deploying robot policies that emulate user actions is described in detail hereinafter. Although the illustrative embodiment is described in the context of a various commercial products, namely Microsoft's Windows NT and Hewlett Packard's ManageX products, it is to be understood that their inclusion in the description of the illustrative embodiment is intended by way of example only and not limitation. It will be appreciated by those skilled in the art that as various other commercial and/or custom-developed products become available that provide the essential functionality required to implement the invention, that these alternative products may be employed to implement the invention in place of the commercial products described herein.

Figure 1:
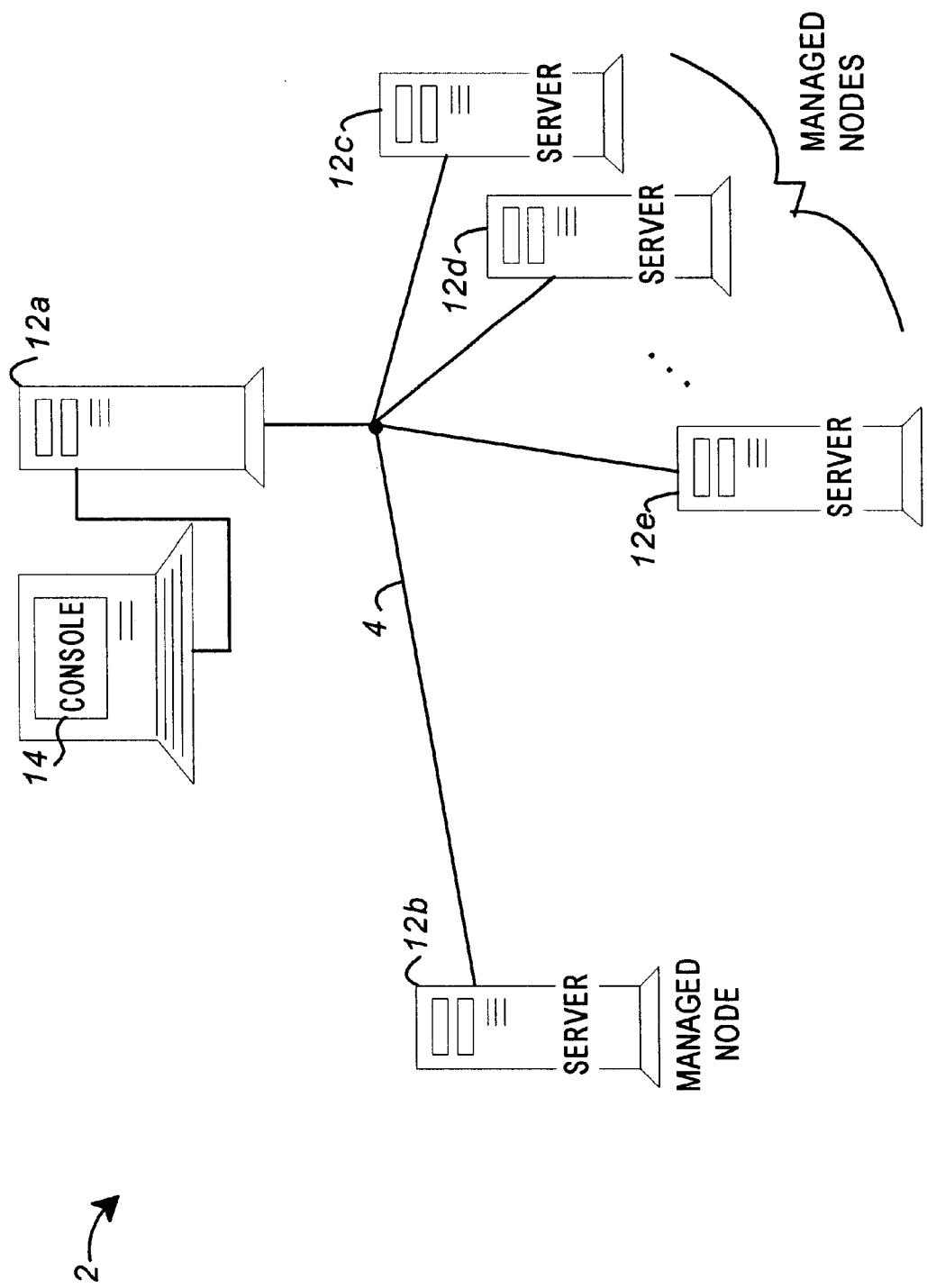
FIG. 1 is a block diagram of a network in which the present invention operates.

FIG. 1 is a block diagram of a network 2, which includes a plurality of computers, or network nodes, 12a–e in communication with one another via a network 4. In the illustrative embodiment, each of computers 12a–e run Windows NT, a distributed, client-server operating system that is capable of running on multiple hardware architectures and platforms. Network 2 includes one network node 12a that operates as a managing console, executing managing console software 14. Nodes 12b–12e are managed nodes.

Managing console software 14 is a proactive network system management software package that allows administrators to automatically deploy software updates, agents and policies to every managed node 12b–12e. In the illustrative embodiment, managing console software 14 is Hewlett Packard's ManageX, which enables enterprise-wide administration of Microsoft Windows NT environments, within a centralized, highly scaleable architecture capable of managing thousands of local and/or remote machines. ManageX operates within Microsoft Management Console (MMC), a Windows-based standard designed to give all Windows NT-based management solutions a common graphical interface. MMC is a general-purpose management display framework for hosting administration tools, built as MMC Snap-ins, which are responsible for actually performing management tasks. MMC itself offers no management behavior.

Managing console software 14 has the capability of deploying software agents and policies and which allow conditions to be specified, which, if matched, trigger a set of automated actions. In the illustrative embodiment, these are called Intelligence Functionality Modules. An Intelligence Functionality Module (FM) is a distributed "agent" that may be run on managed nodes. An Intelligence FM runs an ActiveX script called an "Intelligence Policy" that contains matched conditions and associated triggers to be evaluated and executed at the managed node.

ManageX policies are comprised of two components: a "matched condition" and an associated "trigger". The matched condition is a set of rules that contain "if then" logic and filters that determine if the matched conditions are met. For example, an intelligence policy might contain rules that state: if the processor utilization is greater than 70% for over 10 minutes, then the condition is matched. The second component of the policy contains information about the trigger; actions performed when the matched conditions are satisfied. In the prior example, the trigger might send a console message to notify the administrator of the error condition.

Figure 2:
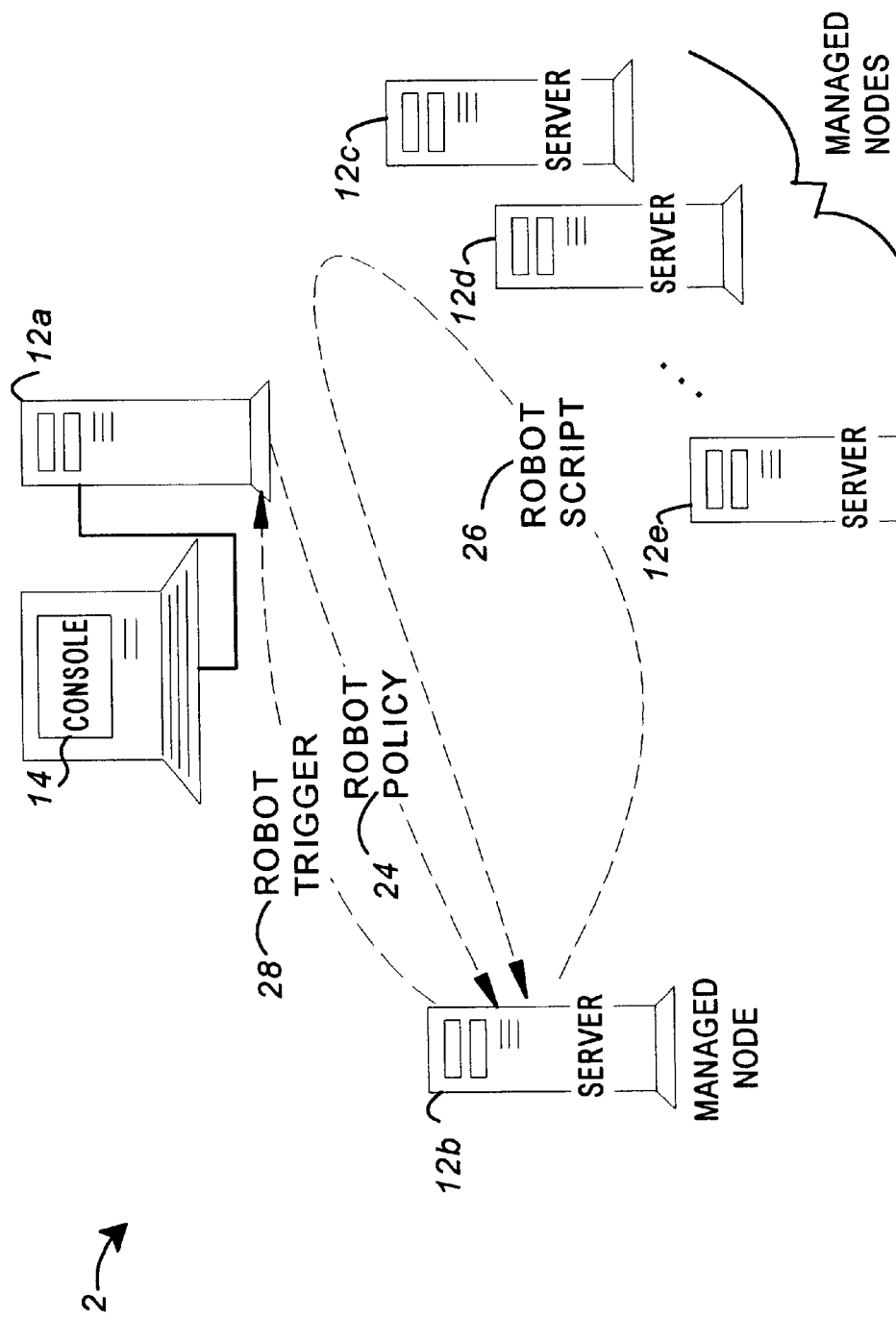
FIG. 2 is a network diagram illustrating the communication flow between network nodes of the network of FIG. 1 when a robot policy implemented in accordance with the invention is executed.

FIG. 2 is a network diagram illustrating the communication flow between the computers 12a–12e in the network 2 when a robot policy implemented in accordance with the invention is executed. In accordance with the invention, managing console 12a deploys a robot policy 24 to a chosen managed node 12b. Robot policy 24 is installed on managed node 12b. A robot script 26 associated with the robot policy 24 that emulates a user action that tests an aspect of one or more of the managed nodes 12b–12e is periodically executed by chosen managed node 12b. Robot policy 24 is configured with a set of matched conditions that, if met, generate a robot trigger 28 which causes a set of automated actions to be taken. In the illustrative embodiment, robot trigger 28 causes a message to be sent to managing console 14.

Figure 3:
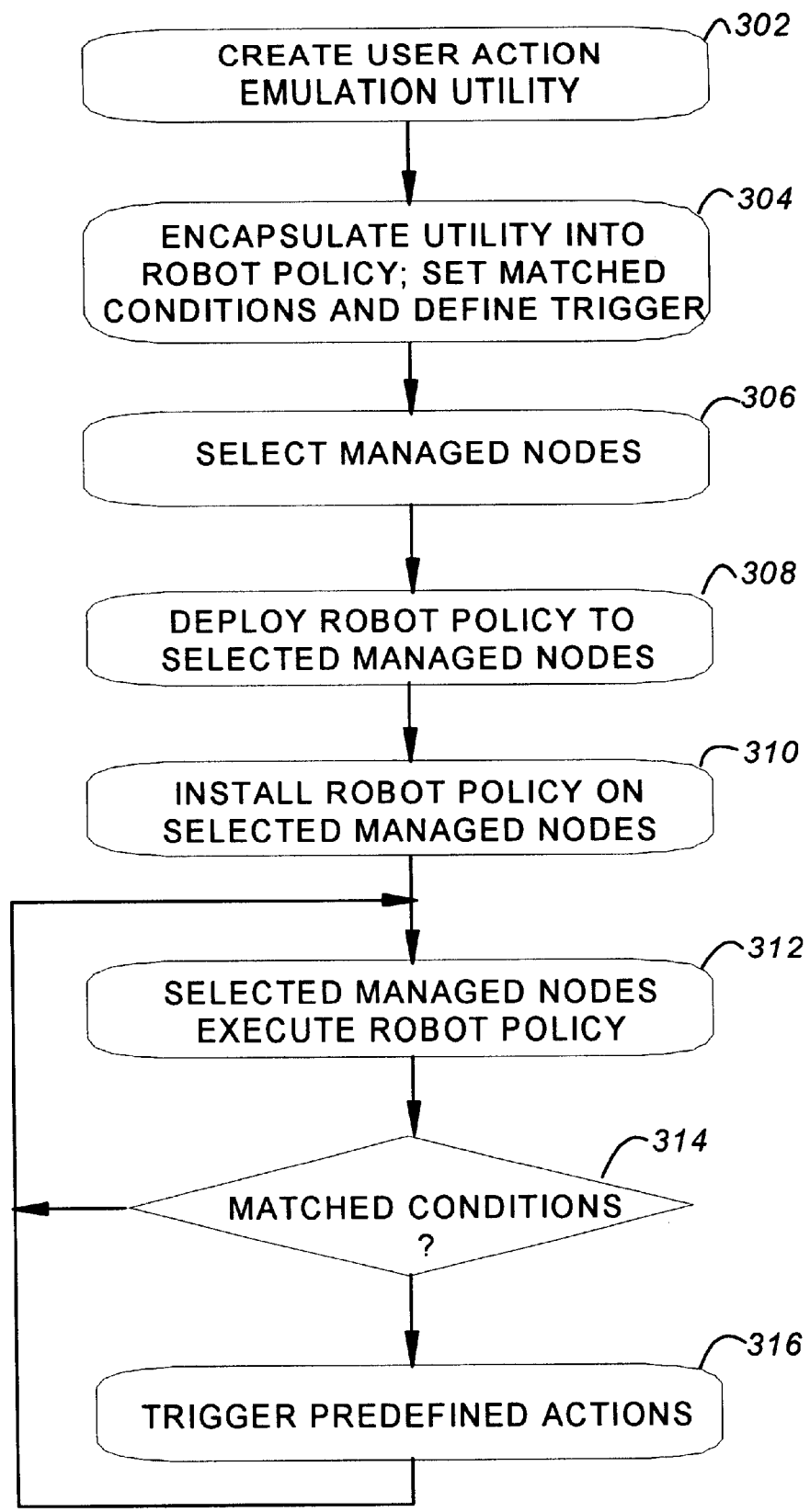
FIG. 3 is a flowchart of a method in accordance with the invention.

FIG. 3 is a flowchart of the method of the invention. In a first step 302, a user action emulation utility is written. The user action emulation utility automatically performs one or more actions that would normally be triggered by user input. For example, a robot policy that emulates a user clicking on a link to one of the web sites of a managed node would include a user action emulation utility that causes the web page associated with that link to be downloaded. In a step 304, the user action emulation utility is encapsulated into a robot policy, defining the matched condition and trigger actions. One or more managed nodes are selected to execute the robot policy in step 306. In a step 308, the robot policy is deployed to the selected managed node(s). In a step 310, the robot policy is installed on the selected managed nodes. In step 312, the selected node(s) execute the user action emulation utility. In a step 314, the robot policy determines if the matched conditions are met, and triggers the predefined automated action(s) in step 316 if the matched conditions are met. The robot policy executes periodically on each of the selected managed node(s).

Appendix A illustrates an example Web robot policy implemented as a ManageX intelligence policy that executes a webping utility and parses the output for response time and error conditions. The webping utility receives two parameters—the name of the web server and the name of the web page—and returns an error code (including one of "302 object moved", "404 object", "could not connect", "host not found", "200 ok", and "Unknown Error") indicating the success or failure of accessing the web page. If the web page is successfully accessed, he webping utility also returns response time information which may be parsed by the robot policy to compare to matched conditions.

The Web robot policy illustrated in Appendix A is written in ActiveX script, which is well known by those skilled in the art. The matched conditions in this embodiment are identified using the "case" statement. Different performance data is returned depending on the error code returned by the webping utility. The trigger action is the generation of a Microsoft Manager Console (MMC) Alert message containing the information pertaining to the results of the attempt to access the web page.

The ManageX Web robot policy monitors and trends the performance of any virtual web site on a managed web server. Unlike prior art policies and network management systems, where monitoring the server process may inform the network administrator of excessive "404 Not found" errors but not which web site generated the error or response time, robot policies of the invention efficiently determine this information that is of concern from the user's standpoint and informs the administrator as soon as the condition is detected. This allows the administrator to address and correct the problem before any (or very many) users encounter it. Thus, with the web robot policy, the service availability of a managed node's web sites and web servers can be measured and archived, and the system administrator can be proactively notified when problems occur. The response time and web service availability can be written to a database and processed to generate error and service availability reports.

Figure 4:
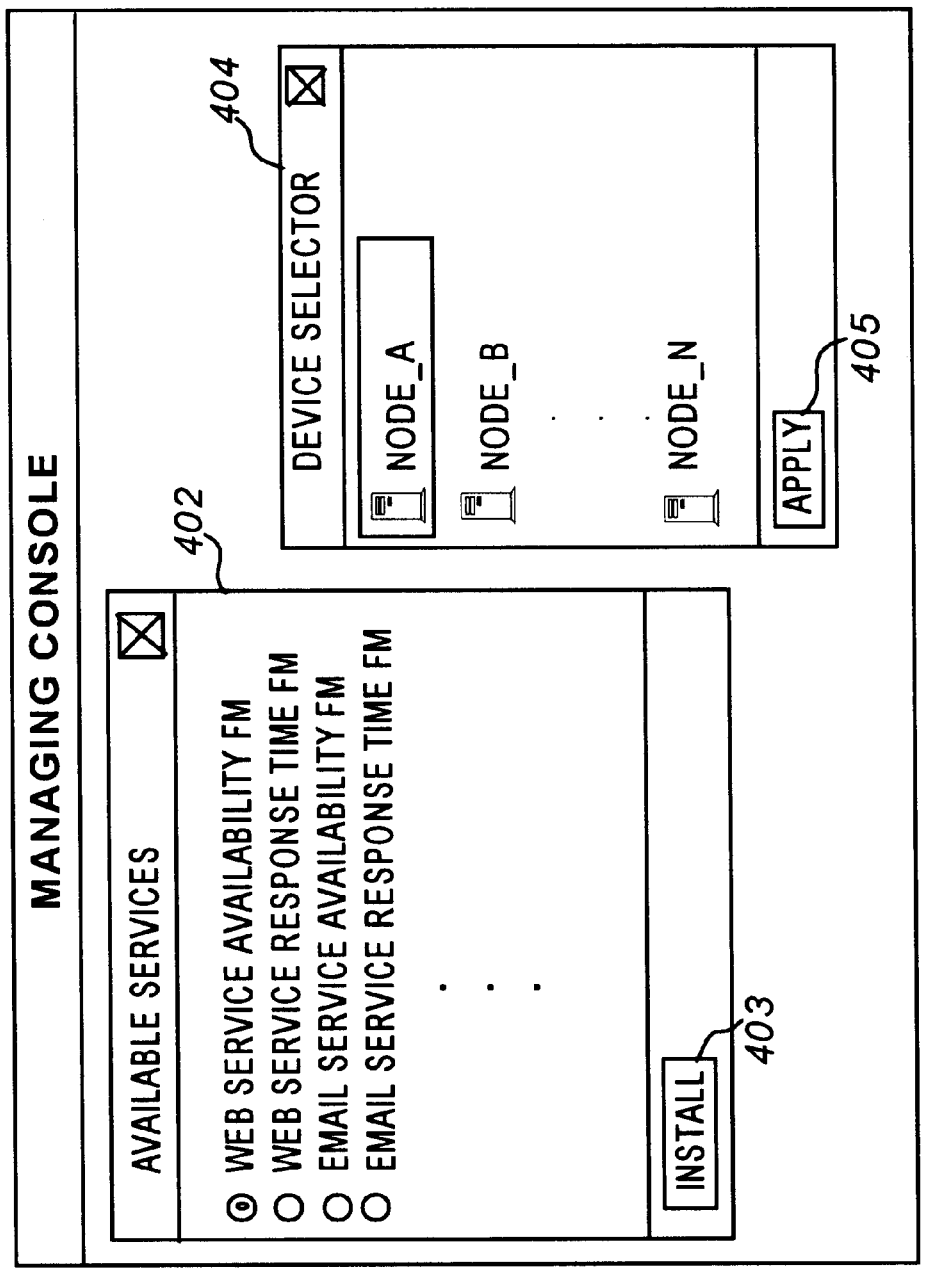
FIG. 4 is a diagram illustrating a user interface for deploying a robot policy.
Figure 5:
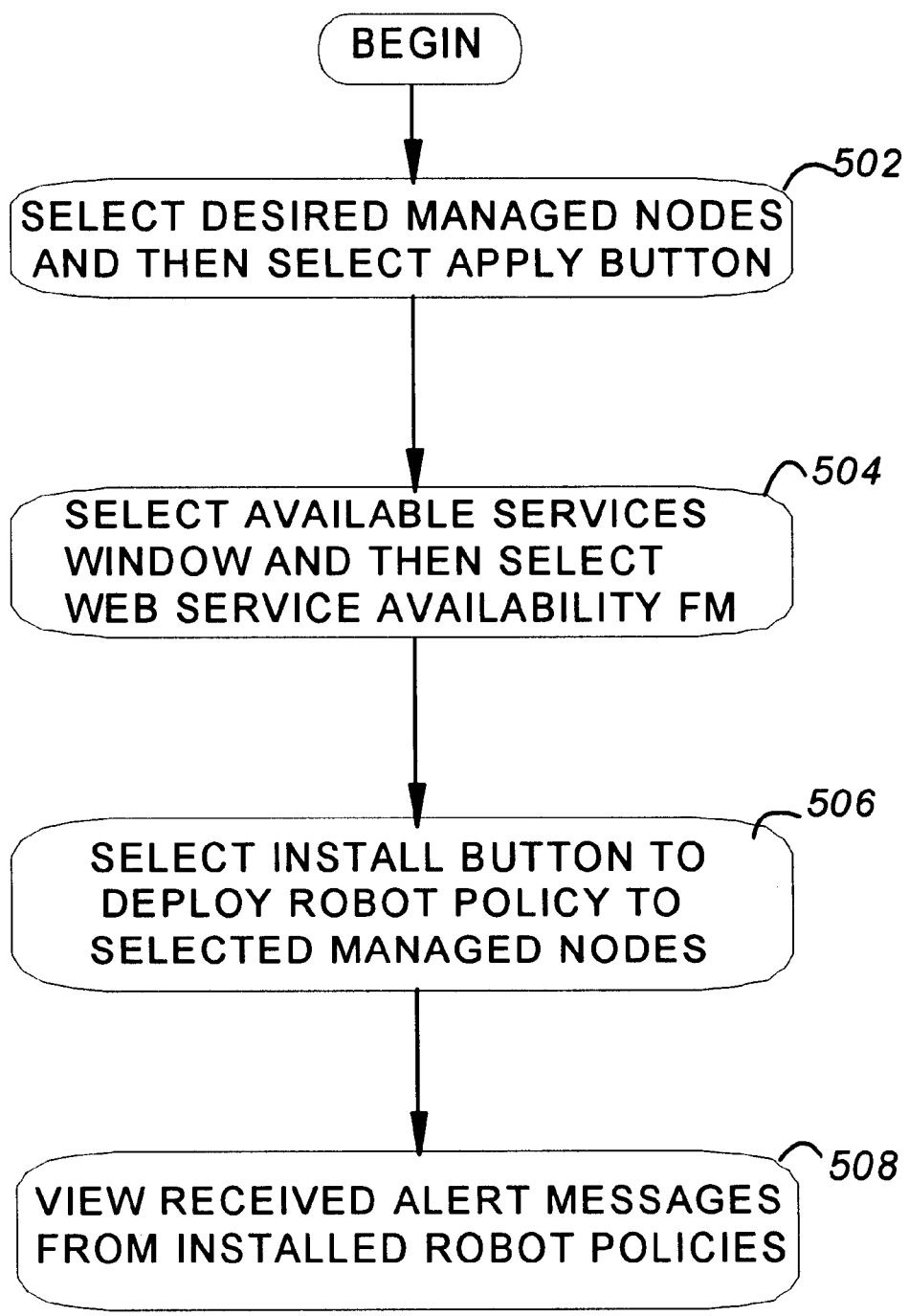
FIG. 5 is a flowchart illustrating the steps taken by a user to deploy a robot policy.

FIG. 4 is an example portion of the user interface, namely ManageX using the MMC framework, illustrating the selection and deployment of a robot policy. FIG. 5 is a flowchart outlining the steps taken for deploying the web robot policy described in Appendix A using Hewlett Packard's ManageX. This accomplished by creating a new ManageX package FM which will deploy the utility to any ManageX managed node in the environment.

In a step 502, the targeted ManageX robot system(s) (i.e., selected managed nodes) are selected using the ManageX device selector 402, as illustrated in FIG. 4. Inside of the device selector 402, the user selects the desired managed nodes NODE_A, NODE_B, . . . , NODE_N, and then selects the Apply button 403. In step 504, the user selects the available ManageX FM's 404 to display the available services (Web Service Availability FM, Web Service Response Time FM, Email Service Availability FM, etc.), and then selects the Web Service Availability FM. In step 506, the user selects the Install button 405. This distributes the webping utility to the selected managed nodes, thereby deploying the robot policy to monitor web service availability.

It will be clear to those skilled in the art that robot policies implemented in accordance with the invention may be applied to monitor the performance of any user action. For example, a robot policy may be set up to monitor the availability of email addresses on a given server. This may be set up by implementing a user action emulation utility that sends test emails to one or more email addresses on a server. An email robot policy implemented in accordance with the invention would then cause the email utility to be executed on one or more selected nodes, and would then monitor the success or failure of the transmission of the email and/or the length of time it takes for the email message to arrive at the target destination.

Although the invention has been described in terms of the illustrative embodiments, it will be appreciated by those skilled in the art that various changes and modifications may be made to the illustrative embodiments without departing from the spirit or scope of the invention. It is intended that the scope of the invention not be limited in any way to the illustrative embodiment shown and described.

APPENDIX A

```
'--- ManageX Web Robot Policy
 dim cmdline, WebServer, WebPage, Output, TempOutput,
 bMsgOnSuccess, bError
 '========== Parameter Section =================
   '--- Enter server name as IP address or fully qualified domain name
(www.microsoft.com)
 WebServer = "davernt"
   '-- Enter WebPage as virtual directory (with trailing /) or actual
   HTML file
 WebPage = "/managex/main.htm"
     '--- WebPage = "default.asp"
     '--- WebPage = "/VirtualDir/AnyFile.HTML"
   -- Notify on all attempts even if successful...nice for testing.
 bMsgOnSuccess = False
 '========== End Parameter Section =================
 bError = False
   '--- Format the command
 cmdline = "webping.exe" & Trim(WebServer) & "" & Trim(WebPage)
   '--- Execute command line with parameters
 Output = Server.ExecuteEX(cmdline)
   '--- Set common message options
 AlertInfo.Source = "ManageX Web Ping"
   '--- Evaluate the output!
 TempOutput = Icase(Trim(Output))
 Select Case True
   Case Instr(TempOutput, "302 object moved") > 0
     '--- This is a redirection...need further eval.
     If Instr(TempOutput, "200 ok") > 0 Then
```

APPENDIX A-continued

```
       '--- redirected OK.
       bError = False
       AlertInfo.Category = "Successful Redirection"
       AlertInfo.EventID = 52100
       AlertInfo.Type = 1 'Information
       AlertInfo.Description = "The server" & WebServer & "redirection
successful." & vbNewLine & vbNewLine
       AlertInfo.Description = AlertInfo.Description & "The full return
text follows:" & vbNewLine & vbNewLine
       AlertInfo.Description = AlertInfo.Description & Output
     else
       '--- Not redirected ok...
       bError = True
       AlertInfo.Category = "Failed Redirection"
       AlertInfo.EventID = 52101
       AlertInfo.Type = 4 'Error
       AlertInfo.Description = "The server" & WebServer & "redirection
unsuccessful using the following command:" & vbNewLine & vbNewLine
       AlertInfo.Description = AlertInfo.Description & cmdline &
vbNewLine & vbNewLine
       AlertInfo.Description = AlertInfo.Description & "The full return
text follows:" & vbNewLine & vbNewLine
       AlertInfo.Description = AlertInfo.Description & Output
     end if
   Case Instr(TempOutput, "404 object") > 0
     '--- No page returned
     bError = True
     AlertInfo.Category = "Object Moved"
     AlertInfo.Type = 4 'Error
     AlertInfo.EventID = 52102
     AlertInfo.Description = "No web page was returned from the following
command:" & vbNewLine & vbNewLine
     AlertInfo.Description = AlertInfo.Description & cmdline &
vbNewLine & vbNewLine
     AlertInfo.Description = AlertInfo.Description & "The full return
text follows:" & vbNewLine & vbNewLine
     AlertInfo.Description = AlertInfo.Description & Output
   Case Instr(TempOutput, "could not connect") > 0
     '--- No connection to the server...need further eval.
     bError = True
     AlertInfo.Type = 4 'Error
     if Instr(TempOutput, "10061") > 0 then
       '--- Server found but no response
       AlertInfo.Category = "No Server Response"
       AlertInfo.EventID = 52103
       AlertInfo.Description = "The server" & WebServer & "is not
responding." & vbNewLine & vbNewLine
       AlertInfo.Description = AlertInfo.Description & "The full return
text follows:" & vbNewLine & vbNewLine
       AlertInfo.Description = AlertInfo.Description & Output
     else
       AlertInfo.Category = "Server Not Found"
       AlertInfo.EventID = 52104
       AlertInfo.Description = "The server" & WebServer & "cannot
be found." & vbNewLine & vbNewLine
       AlertInfo.Description = AlertInfo.Description & "The full return
text follows:" & vbNewLine & vbNewLine
       AlertInfo.Description = AlertInfo.Description & Output
     end if
   Case Instr(TempOutput, "host not found") > 0
     bError = True
     AlertInfo.Category = "Invalid Hostname"
     AlertInfo.EventID = 52105
     AlertInfo.Type = 4 'Error
     AlertInfo.Description = "The server" & WebServer & "cannot
be found." & vbNewLine & vbNewLine
     AlertInfo.Description = AlertInfo.Description & "The full return
text follows:" & vbNewLine & vbNewLine
     AlertInfo.Description = AlertInfo.Description & Output
   Case Instr(TempOutput, "200 ok") > 0
     bError = False
     AlertInfo.Category = "Successful Connect"
     AlertInfo.EventID = 52100
     AlertInfo.Type = 1 'Information
     AlertInfo.Description = "The server" & WebServer & "successful
return of page." & vbNewLine & vbNewLine
     AlertInfo.Description = AlertInfo.Description & "The full return
text follows:" & vbNewLine & vbNewLine
     AlertInfo.Description = AlertInfo.Description & Output
```

APPENDIX A-continued

```
Case Else
  '--- Unknown return
bError = True
    bError = False
    AlertInfo.Category = "Unknown Error"
    AlertInfo.EventID = 52110
    AlertInfo.Type = 4 'Error
    AlertInfo.Description = "The server" & WebServer & "returned
an error." & vbNewLine & vbNewLine
    AlertInfo.Description = AlertInfo.Description & "The full return
text follows:" & vbNewLine & vbNewLine
    AlertInfo.Description = AlertInfo.Description & Output
End Select
if bError = True Then
  AlertInfo.Push
Else
  if bMsgOnSuccess = True then
    AlertInfo.Push
  end if
  AlertInfo.Push
End if
  AlertInfo.Push
```

What is claimed is:

1. A robot policy, comprising:

a user action emulation utility which emulates a user action and receives an error code result responsive to said user action; and a functionality module configured with a set of predefined conditions which monitors said error code result and triggers a set of predefined automated actions if said error code result meets said predefined conditions.

2. A robot policy in accordance with claim 1, wherein:

said user action emulation utility comprises a web service availability utility which attempts to access a web page on a web site.

3. A robot policy in accordance with claim 1, wherein:

said user action emulation utility comprises an email service availability utility which attempts to access an email address on a server.

4. A system for monitoring performance data pertaining to user actions performed from a network node of a computer network, said computer network comprising a plurality of network nodes, said system comprising:

a robot policy comprising a user action emulation utility which emulates a user action and receives an error code result responsive to said user action; and a functionality module configured with a set of predefined conditions which monitors said error code result and triggers a set of predefined automated actions if said error code result meets said predefined conditions;

a managed node selector responsive to a selection of one or more of said managed nodes;

a service availability selector responsive to a selection of said robot policy by deploying said robot policy to said selected managed nodes, said deployment of said robot policy causing said functionality module to be installed on said selected managed nodes and said user action emulation utility to be executed periodically by said selected managed nodes.

5. A system in accordance with claim 4, wherein:

said user action emulation utility comprises a web service availability utility which attempts to access a web page on a web site.

6. A system in accordance with claim 4, wherein:

said user action emulation utility comprises an email service availability utility which attempts to access an email address on a server.

7. A method for monitoring performance data pertaining to user actions performed from a network node of a computer network, said computer network comprising a plurality of network nodes, said method comprising:

executing a user action emulation utility on one of said plurality of network nodes, said user action emulation utility automatically emulating a user action and receiving an error code result responsive to said user action;

comparing said error code result with a set of predefined conditions; and triggering a set of predefined automated actions if said error code result meets said predefined conditions.

8. A method in accordance with claim 7, comprising:

encapsulating said user action emulation utility, said set of matched conditions, and said set of trigger actions into a robot policy.

9. A method in accordance with claim 7, comprising:

deploying said robot policy to one or more of said network nodes from a managing console.

10. A method in accordance with claim 9, said deploying step comprising:

selecting one or more of said network nodes;

selecting said robot policy;

installing said robot policy on each of said selected network nodes;

executing said robot policy on each of said selected network nodes.

11. A method in accordance with claim 7, comprising:

creating said user action emulation utility.

12. A robot policy in accordance with claim 7, wherein:

said user action emulation utility comprises a web service availability utility which attempts to access a web page on a web site.

13. A robot policy in accordance with claim 7 wherein:

said user action emulation utility comprises an email service availability utility which attempts to access an email address on a server.

* * * * *